(12) United States Patent
De La Celle et al.

(10) Patent No.: US 8,919,291 B2
(45) Date of Patent: Dec. 30, 2014

(54) REHABILITATION OR MOBILITY ASSISTANCE DEVICE FOR A QUADRUPED ANIMAL

(75) Inventors: Roland De La Celle, Antibes (FR); Raymond De La Celle, Ris Orangis (FR)

(73) Assignee: Sophiadog, Ris Orangis (FR)

( * ) Notice: Subject to any disclaimer, the term of this patent is extended or adjusted under 35 U.S.C. 154(b) by 106 days.

(21) Appl. No.: 13/394,281

(22) PCT Filed: Sep. 6, 2010

(86) PCT No.: PCT/FR2010/051847
§ 371 (c)(1),
(2), (4) Date: Mar. 5, 2012

(87) PCT Pub. No.: WO2011/027088
PCT Pub. Date: Mar. 10, 2011

(65) Prior Publication Data
US 2012/0160185 A1    Jun. 28, 2012

(30) Foreign Application Priority Data

Sep. 7, 2009  (FR) ...................................... 09 04239
Oct. 2, 2009  (FR) ...................................... 09 04721

(51) Int. Cl.
*A61D 3/00* (2006.01)

(52) U.S. Cl.
CPC ........................................ *A61D 3/00* (2013.01)
USPC ...................................................... 119/727

(58) Field of Classification Search
CPC ..... A01K 15/00; A01K 15/02; A01K 15/027; A61D 3/00
USPC ......... 119/702, 703, 725, 726, 727, 728, 174, 119/700, 814, 816, 850, 907; 280/290, 280/827–828; 601/5; 482/54, 66, 69, 70, 482/79, 148

See application file for complete search history.

(56) References Cited

U.S. PATENT DOCUMENTS

| 4,777,910 | A | 10/1988 | Pecor |
| 5,224,444 | A | 7/1993 | Hill et al. |
| 6,820,572 | B1 * | 11/2004 | Parkes ........................... 119/727 |
| 7,549,398 | B2 * | 6/2009 | Robinson et al. ............. 119/727 |

FOREIGN PATENT DOCUMENTS

| FR | 2949666 | 3/2011 |
| FR | 2950797 | 4/2011 |

* cited by examiner

*Primary Examiner* — Rob Swiatek
*Assistant Examiner* — Ebony Evans
(74) *Attorney, Agent, or Firm* — Greer, Burns & Crain, Ltd.

(57) ABSTRACT

A device allowing a quadruped animal that is disabled in the hindquarters thereof to move about, while automatically moving the hind legs of the animal. The device includes: a chassis, on which two side wheels are mounted; a rear harness for receiving and supporting the hindquarters of the animal, which harness can be supported by the chassis; and a crankshaft-type driveshaft having two crankpins to which are attached cradles for moving the hind legs of the animal where the driveshaft is shaped so as to move each of the two hind legs of the animal synchronously in phase opposition. A transmission device is configured to control the rotation of the driveshaft from at least one wheel.

15 Claims, 6 Drawing Sheets

REHABILITATION OR MOBILITY ASSISTANCE DEVICE FOR A QUADRUPED ANIMAL

FIELD OF THE INVENTION

Figure 1:
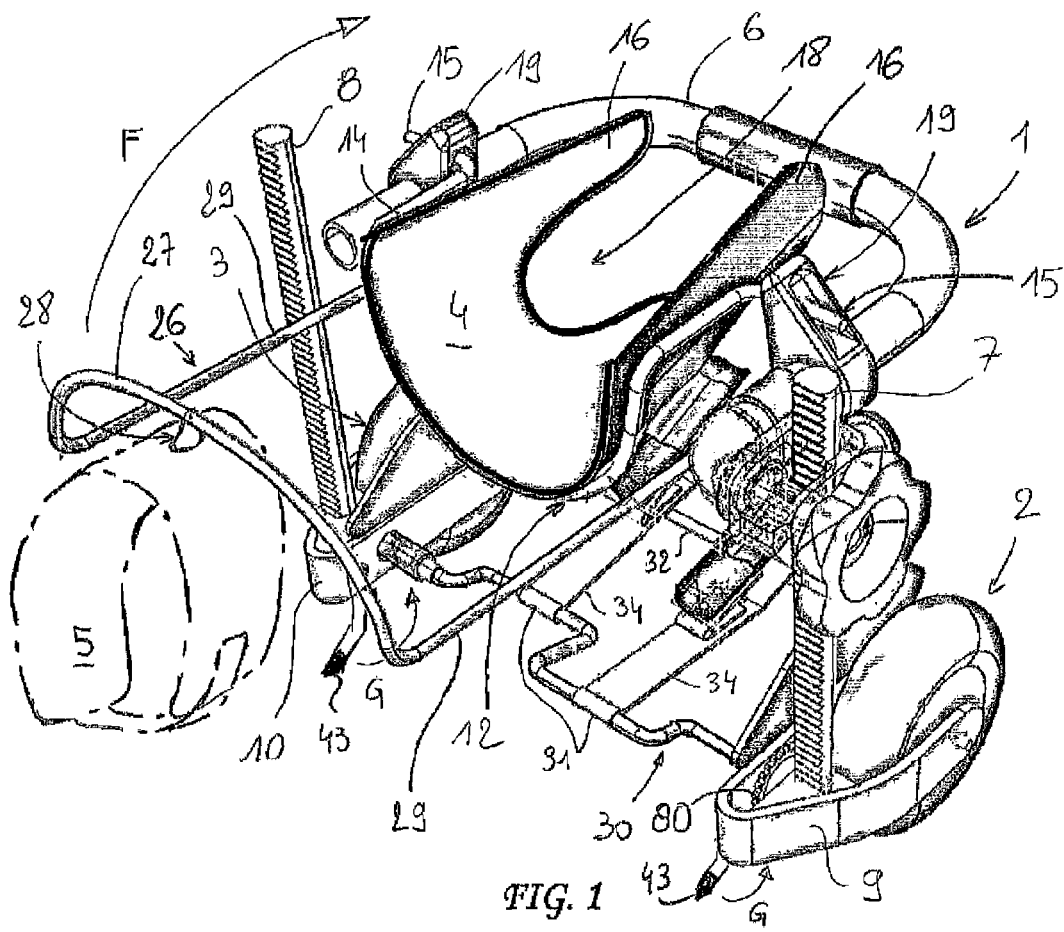

The invention relates to the field of rehabilitation, rehabilitation preparation or mobility assistance apparatuses for quadruped animals, in particular dogs and cats, being disabled or paralysed in the hindquarters thereof.

STATE OF THE ART AND PROBLEMS TO BE SOLVED

Devices are known for supporting the hindquarters of the animal generally in the shape of a cart harnessed to the trunk of the animal, wherein the animal does not need to be wholly or partially supported by its hind legs. These known devices compensate for the deficient supporting functions of the hind legs, but are wholly passive towards the same, in no way providing them with a movement. Yet, it has been observed that it is extremely beneficial for the deficient limbs to cause them to perform movements suitable for maintaining or even restoring motor functions of the animal thanks to an improvement of its muscular, vascular as well as joint abilities. These exercises are per se a rehabilitation mode or a preparatory rehabilitation phase the efficiency of which has been demonstrated. The device described in document U.S. Pat. No. 4,777,910 provides a system with pedals driven by the wheels of the device as it advances, in order to cause a cyclic movement of the hind legs of the animal which are received and supported in slippers driven by the pedals. However, this device enables neither the synchronisation of movements of both legs between each other, nor the offset or phase shift between movements of both legs to be controlled. Furthermore, the harnesses of the device and its maintaining with respect to the animal are very rudimentary and uncomfortable to the animal. Besides, it is noted that the hind legs of the animal should preserve a minimum tonicity otherwise the hindquarters of the animal could collapse with such a device.

AIM OF THE INVENTION

The aim of the present invention is to overcome all or part of the above drawbacks.

OBJECT OF THE INVENTION

To that end, the object of the invention is a device allowing a quadruped animal that is disabled in the hindquarters thereof to move about, while automatically moving the hind legs of the animal, characterised in that it includes:
  a chassis, on which two side wheels are mounted;
  a rear harness for receiving and supporting the hindquarters of the animal, which harness can be supported by the chassis;
  a crankshaft-type driveshaft having two crankpins to which are attached means for moving the hind legs of the animal, said driveshaft being shaped so as to move each of the two hind legs of the animal synchronously in phase opposition like the movement of a chainset,
  transmission means for controlling rotation of the driveshaft from at least one wheel.
Thus, the crankshaft makes a direct link between the means for moving each of the hind legs, which ensures the synchronism thereof and the 180° phase shift in the configuration thereof. Phase opposition movements ensure a perfect comfortable balancing of the animal equipped with the device according to the invention. The device is further robust and adaptable to different morphologies and heights of animals. The device is further very finely adaptable to the pathology, the behaviour and the progress of the animal as it is used in a rehabilitation process.

According to further advantageous features of the invention, the transmission means include locking/unlocking means selectively providing the actual transmission of the rotational movement of the driveshaft from at least one wheel or the discontinuation of this transmission.

According to yet other advantageous features of the invention, the driveshaft is removably rotatably mounted to the chassis.

According to yet other advantageous features of the invention, the rear harness includes a frame attached to the chassis by pawling means, allowing in particular a vertical stroke of the rear harness.

According to yet other advantageous features of the invention, the device includes height adjusting means for the vertical position of the rear harness with respect to the chassis, such height adjusting means being in particular of the rack-and-pinion type.

According to yet other advantageous features of the invention, the rear harness is generally in the shape of a belt surrounding the abdomen of the animal, which belt is provided with an extension making up a pelvic bracket.

According to yet other advantageous features of the invention, the means for moving the hind legs of the animal include two slippers wherein the two hind legs of the animal are received and supported in order for them to move as a chainset.

According to yet other advantageous features of the invention, the device includes harnessing means able to attach the thoracic part of the animal to the chassis via a front harness, said harnessing means being in particular pivotable with respect to the chassis.

According to yet other advantageous features of the invention, the means for moving the hind legs of the animal include two cradles to which the two slippers are attached respectively.

According to yet other advantageous features of the invention, the driveshaft is located ahead of the wheels relatively to the front-rear longitudinal direction, each cradle being driven at the front by a respective crankpin of the driveshaft on which it is rotatably mounted, and resting at the rear on a supporting shaft carried by the chassis.

According to yet other advantageous features of the invention, each cradle includes a lowered front part providing a ground clearance lowered with respect to the rear part.

According to yet other advantageous features of the invention, the driveshaft is substantially coaxial with the axis of the wheels, the chassis including an anterior part and a posterior part, the posterior part in turn including an upper rigid subassembly for supporting the rear harness, whereas the anterior part is rotatably mounted with respect to the posterior part about a substantially vertical axis, the anterior part being further attached to the front harness.

According to yet other advantageous features of the invention, the driveshaft is substantially coaxial with the axis of the wheels, the device further including a crankshaft-type follower shaft with two crankpins, which shaft is located ahead of the driveshaft, and driven by the same via a transmission means, each cradle being driven at the rear by a respective crankpin of the driveshaft on which it is rotatably mounted, and resting at the front on a corresponding crankpin of the follower shaft.

According to yet other advantageous features of the invention, a single wheel is able to drive the driveshaft whereas the other wheel is free.

According to yet other advantageous features of the invention, the reduction ratio between the driveshaft and the driving wheel is generally between ⅓ and 1, and is in particular ½ and can be adjusted as a function of the animal's physical condition.

Still another object of the invention is a device having all or part of the following features:

- the device is comprised of a two-part harness, a front harness and a rear harness, supported by a bottom chassis also made in two parts, an anterior part and a posterior part, the posterior part in turn including an upper rigid subassembly for supporting the rear harness for receiving and supporting the hindquarters of the animal, the posterior part of the chassis receiving a crankshaft-type shaft connecting its ends to two wheels and operating as a chainset;
- the crankshaft is provided with two slippers and enables both slippers to behave as a chainset, which slippers eccentrically moving with respect to each of their adjacent wheel;
- both slippers are comprised of a gutter which receives a respective hind leg of the animal up to a first or second joint of the hind leg of the animal and straps which maintain the slipper-leg assembly;
- the device includes a system of clips which enables the slippers to be attached through their bottom face onto the crankshaft axis by leaving them the possibility of a free rotation on said crankshaft axis, said slippers behaving in parallel to each other eccentrically to their adjacent wheel;
- a single wheel is integral with the crankshaft and acts as a driving wheel;
- a single wheel remains free enabling the device to turn/pivot on itself;
- the chassis is horizontally linked between its anterior part and its posterior part through a linking axis, in turn integral with the posterior parts of the chassis;
- the anterior part of the chassis is connected to a front harness and its posterior part to the rear harness via the chassis posterior part subassembly. The links between the anterior part of the chassis and the front harness as well as between the rigid subassembly with the rear harness are semi-rigid of the strap maintain type;
- a "suitcase handle" type handle connects the front and rear harnesses to enable the animal to be displaced by its master within the framework of crossing pavement or stairs type obstacles;
- the posterior part of the chassis is provided with a bumper for protecting the legs of the animal;
- a thumb wheel is screwed on the crankshaft axis at an intermediate position between the driving wheel and a nut for the purpose of locking or not and on demand said driving wheel in turn responsible for driving the crankshaft.

Still another object of the invention is a device having all or part of the following features:

- the device is comprised of a chassis which integrates two wheels, the same being connected between each other by a shaft comprised in the centre thereof of a first crankshaft, called "drive" crankshaft, a second crankshaft called "follower" crankshaft, of the same type located ahead of the first and connected to the same through two sprocket wheels and a transmission chain, two cradles also connect said crankshafts between each other and two slippers each for receiving one leg of said animal, maintained by its metatarsus in said slipper, are positioned and attached to said cradles with a given angle;
- both crankshafts are of the "double crankpin" type that is a left one and a right one, which allow a movement as a chainset;
- the drive rear crankshaft behaves on a diameter being greater or smaller than the crankshaft located ahead;
- the drive crankshaft connects by its ends both wheels, a single wheel being driving, the second wheel being free;
- both crankshafts are connected and synchronized between each other by two identical sprocket wheels and their transmission chain;
- both cradles are positioned in parallel between each other and connect both crankshafts between each other on the crankpins of the same with one crankpin on each of said crankshafts;
- said cradles are connected and linked only to the drive crankshaft, only resting on the second crankshaft through their lower areas or faces where they slide on the crankpins of the crankshaft;
- said cradles are of concave shape so as to enable their anchoring points to be lowered with respect to said crankpins;
- both slippers are positioned and integral with their respective cradle, by a bracket at an angle thereby enabling an angle to be imposed which will conduct the revolution movement of the hind legs of the animal.

DETAILED DESCRIPTION OF SEVERAL EMBODIMENTS

Figure 2:
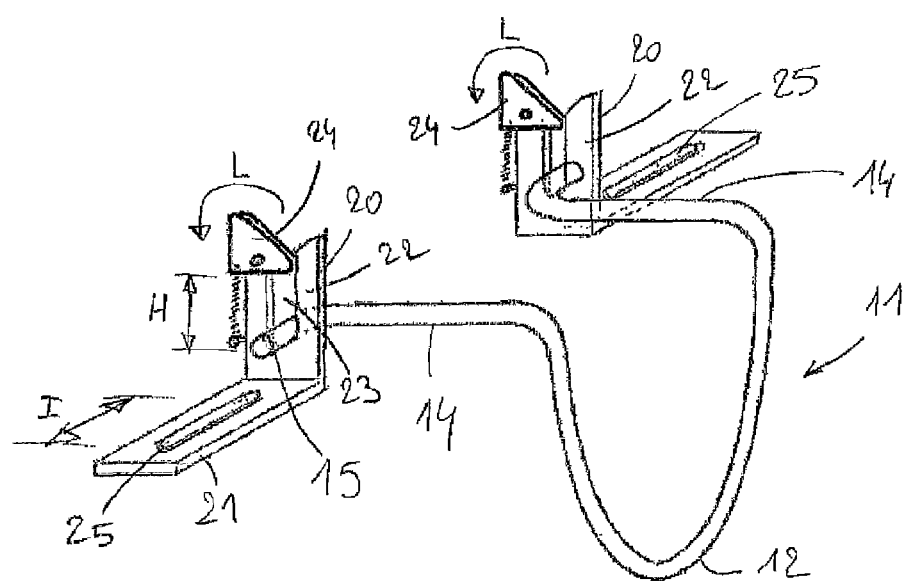
Figure 3:
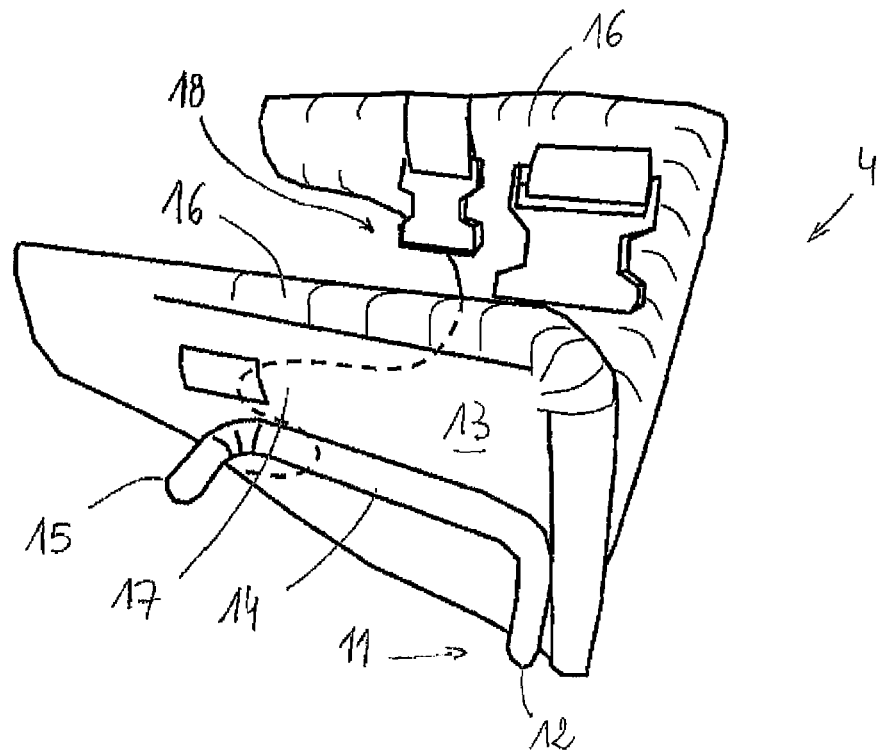
Figure 4:
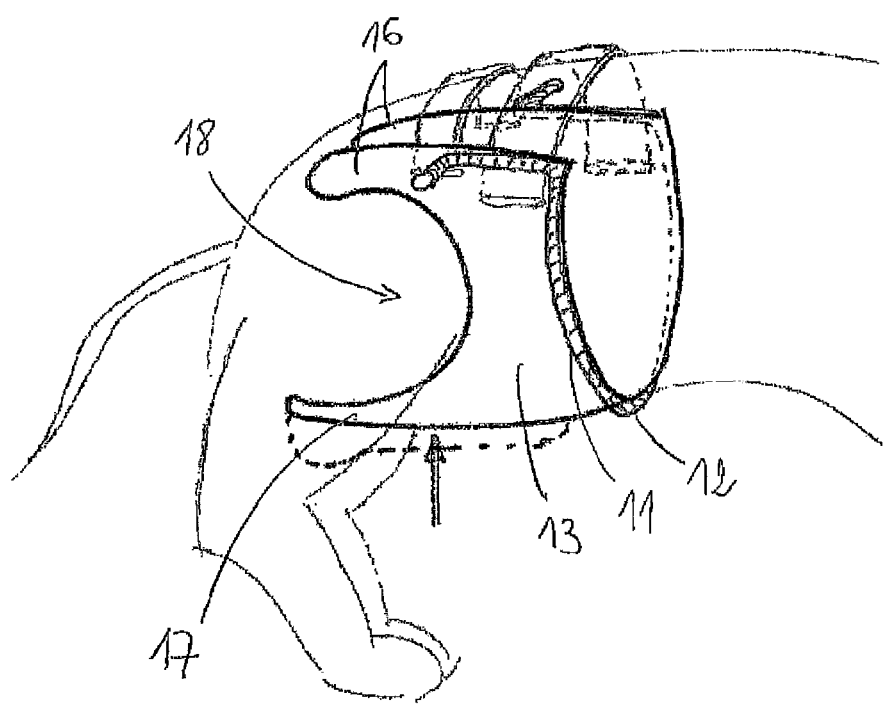
Figure 5:
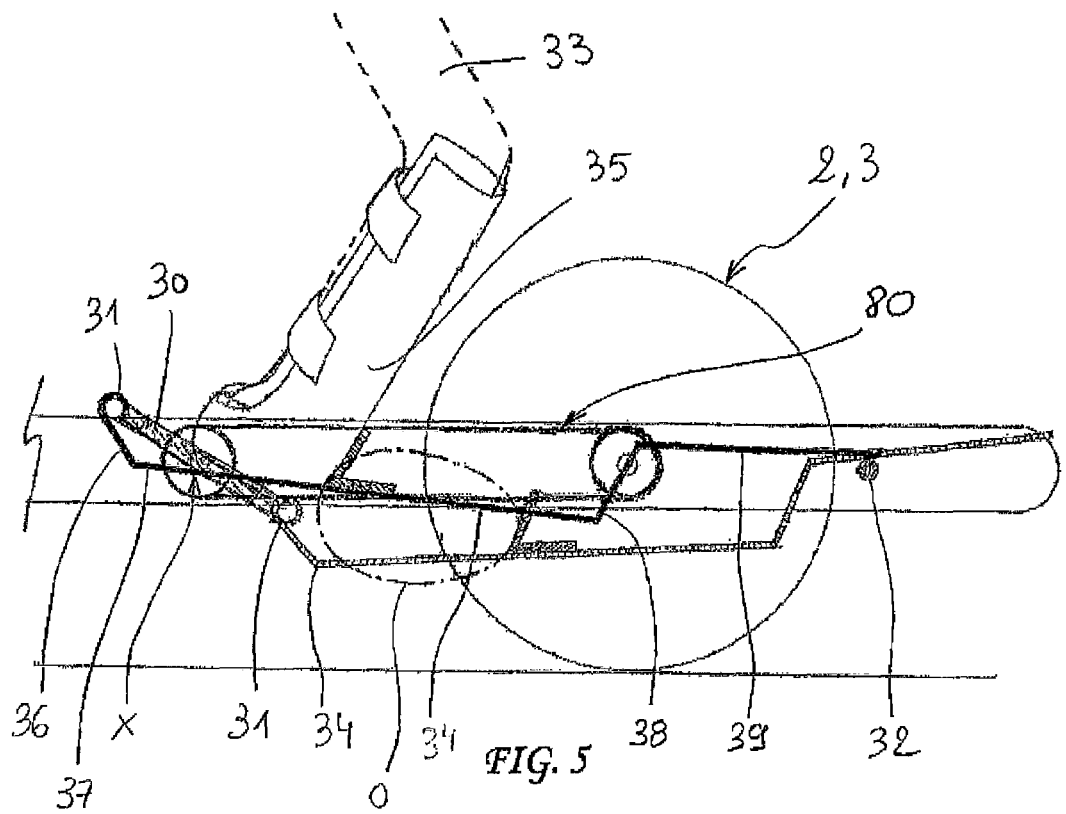
Figure 6:
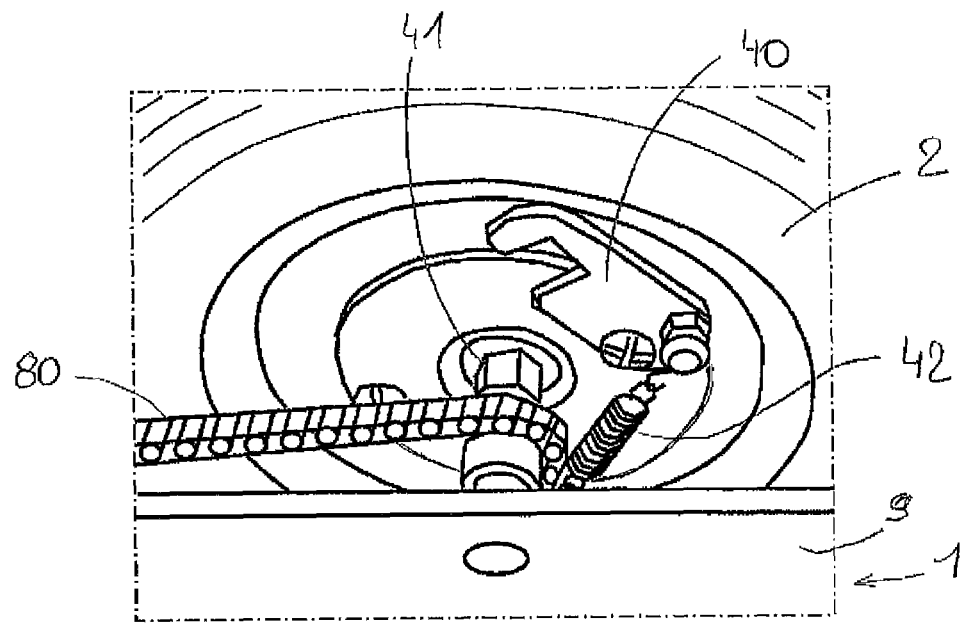
Figure 7:
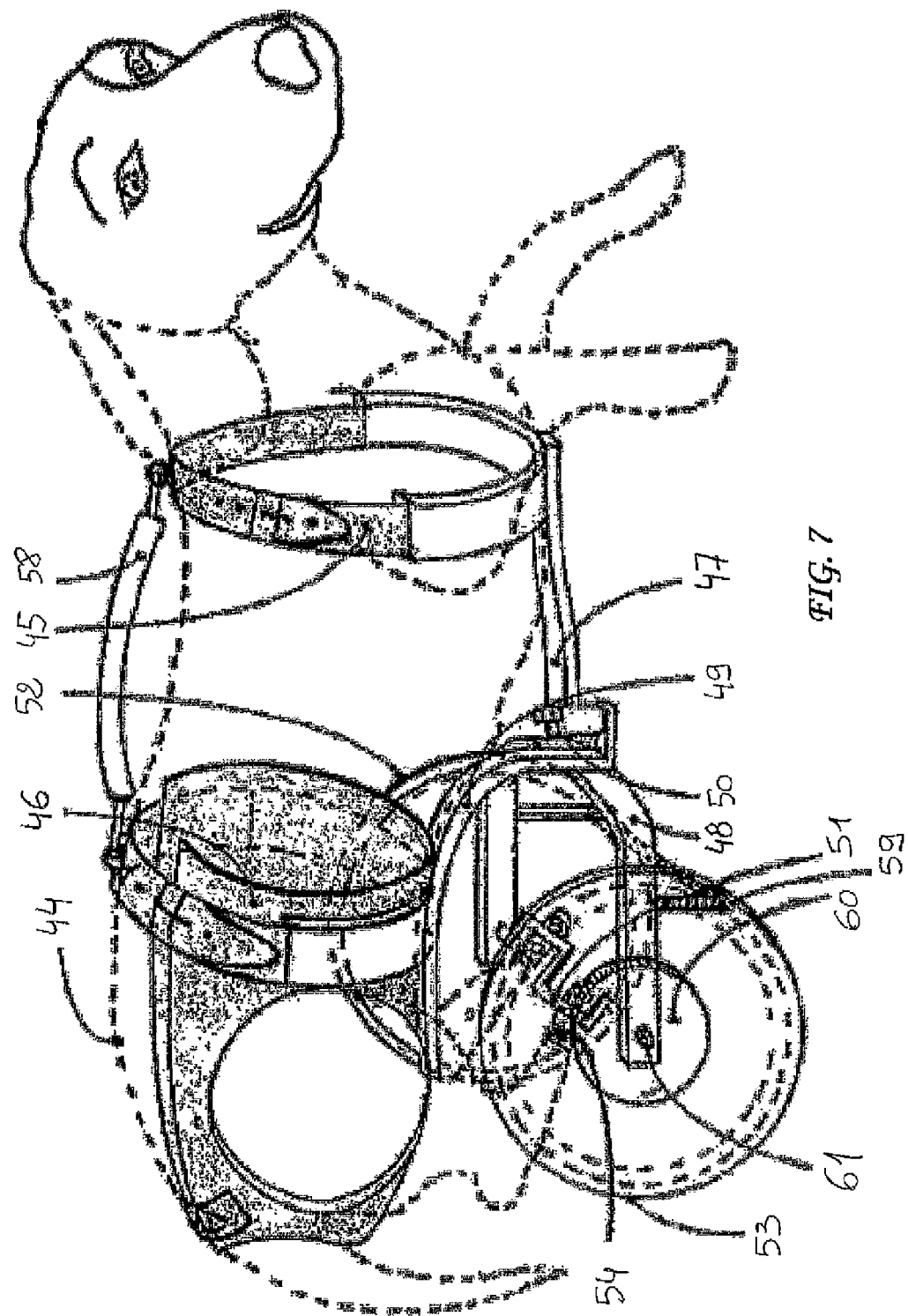
Figure 8:
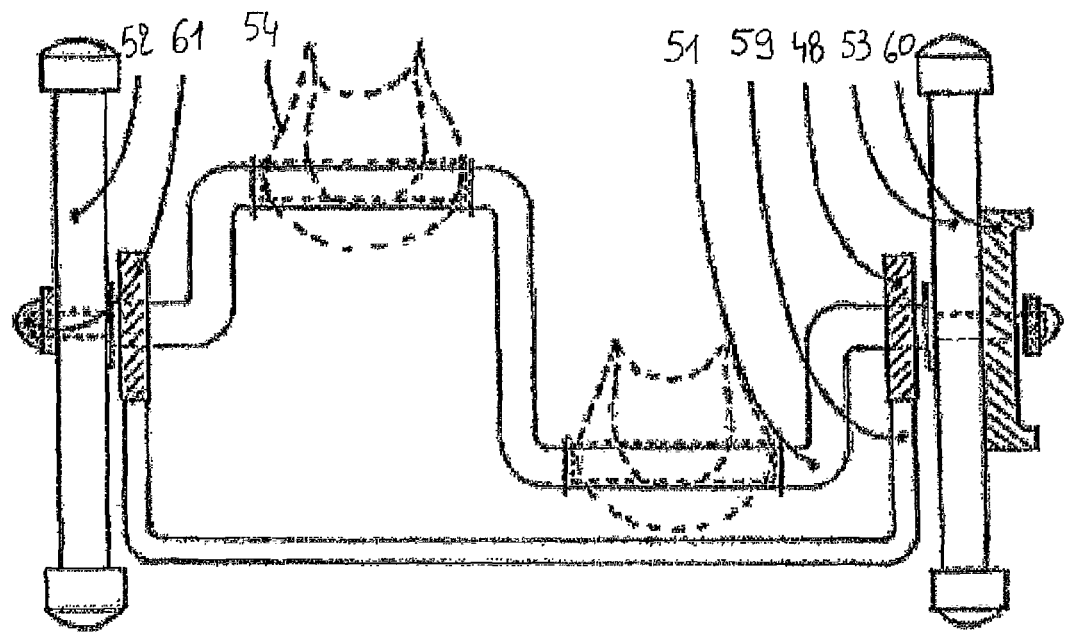
Figure 9:
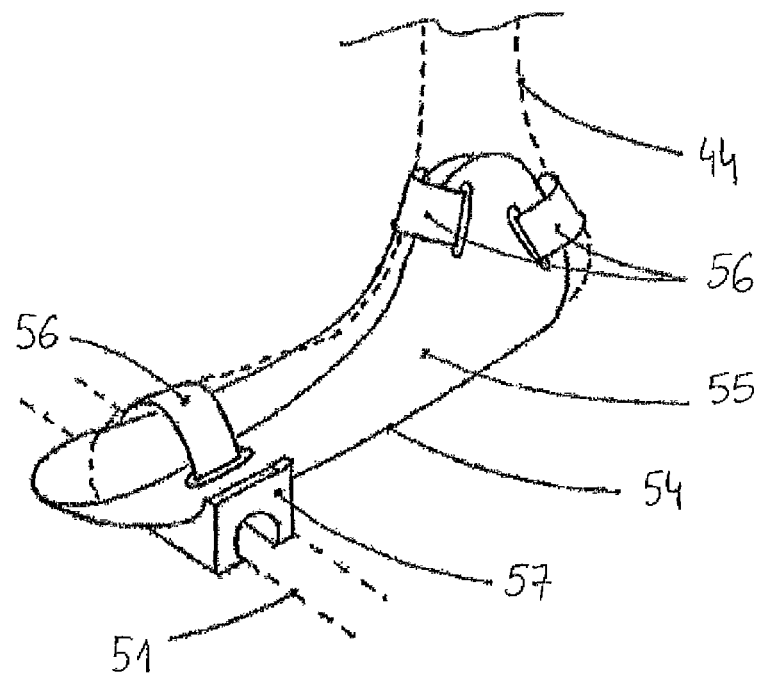
Figure 10:
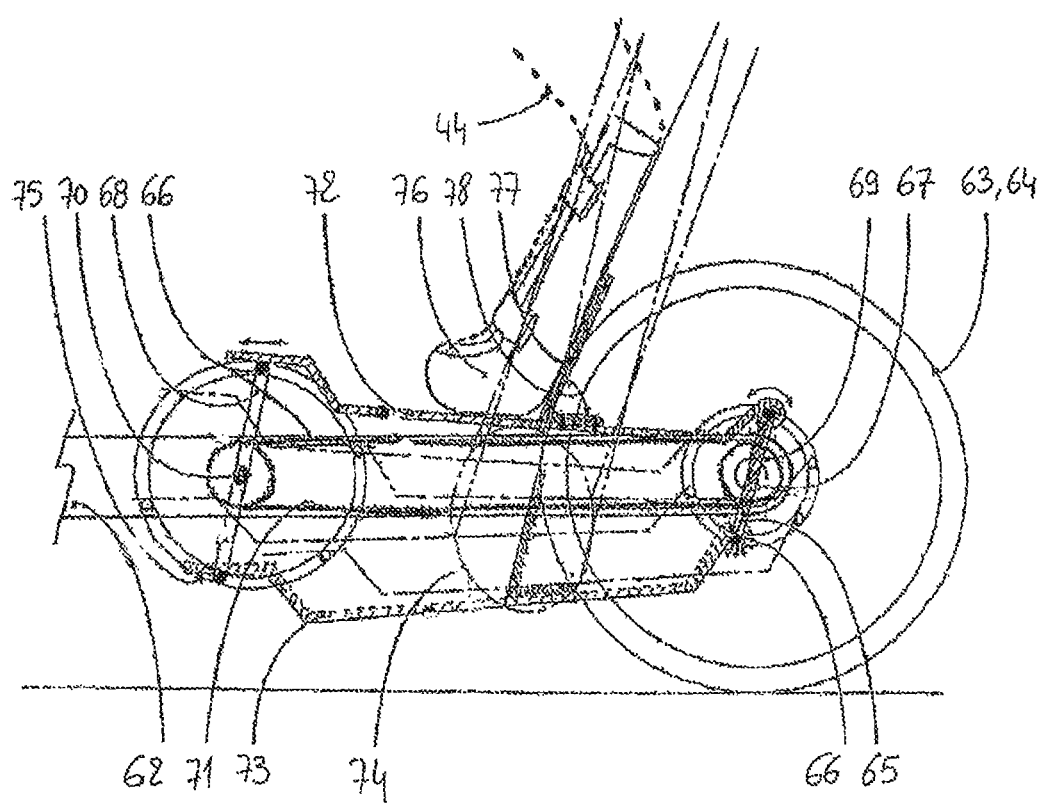

The invention will be better understood upon reading the description that follows of a non-limiting embodiment of the invention and in the light of the appended drawings wherein:

FIG. 1 represents a perspective view of a first embodiment of the device according to the invention, FIG. 2 represents an alternative embodiment of the attachment principle of the rear harness to the chassis of the device according to the invention, FIG. 3 represents a perspective view of the rear harness according to the invention, FIG. 4 schematically represents the rear harness of FIG. 3 provided in the abdomen and pelvic part of a quadruped animal, FIG. 5 represents a schematic side view of the wheels, the drive crankshaft axis and the means for moving the hind legs of the animal, the moving means being provided with two cradles, FIG. 6 is a perspective view of a detail of the device according to the invention of FIG. 1, illustrating an example of a reversible locking/unlocking means between the drive wheel and the drive crankshaft, FIG. 7 represents a perspective view of a second embodiment of the device according to the invention, FIG. 8 represents a front view of the low area located between the wheels of the device of FIG. 7, FIG. 9 represents a perspective view of a slipper for receiving and supporting a hind leg of an animal, and FIG. 10 represents in a side view and analogously to FIG. 5, a third embodiment of the device according to the invention, illustrating the wheels, a drive crankshaft axle, a follower crankshaft and means for moving the hind legs of the animal, the moving means being provided with two cradles.

FIRST EMBODIMENT

FIGS. 1 to 6

There is represented in FIG. 1 a device according to the invention. This device is generally in the form of a cart for being harnessed to the body of the animal. The device includes a rigid chassis 1 made of mechanically welded elements. The chassis is provided with two side wheels 2, 3 longitudinally arranged with respect to the front-rear advancing direction. Throughout the description, the terms "front", "rear", "anterior", "posterior" are used to define some elements and are to be considered with respect to the conventional direction of walk for the animal.

The posterior part of the animal is equipped with a rear harness 4 able to be supported by the chassis 1. This rear harness 4 is to support the hindquarters of the animal which is supported by its front legs on the ground.

The animal is also equipped in its thoracic part with a front harness 5 (represented in chain dotted lines) for taking charge as much as possible of the pulling force of the device by the animal upon walking, this anterior area of the animal, bounded by the shoulders and the thorax being the most suitable for providing these strains and consequently relieving the disabled hindquarter of the animal. While the animal is walking, the harness device is driven/pulled by rolling via side wheels 2, 3.

The chassis 1 includes a carrying element 6 having a generally U shape provided in a substantially horizontal plane and having its opening at the front. The carrying element 6 is connected via its two free ends (front ends) of the U to two respective columns 7, 8 integral with their bottom to respective structure means 9, 10 on which each of wheels 2, 3 is rotatably mounted.

The link between each free end of the U 6 and the corresponding column 7, 8 is of the pinion and rack type, the rack extending along the column, such that the carrying element 6 and the rear harness supporting the animal can be adjusted in height. Each pinion rotatably mounted to the carrying element 6 is manually controlled by a thumb wheel. The right and left thumb wheels can be synchronized via an anti-twist cable passing for example through the carrying element 6. FIG. 1 only presents such linking means on one side for clarity reasons but of course, both sides of the device are symmetrical in this respect. Other alternative embodiments can be contemplated for such linking means between the carrying element 6 and the columns 7, 8 provided that they ensure that the carrying element can be guided to be vertically displaced, and can be stopped/maintained at a determined height.

In reference to FIGS. 1, 3 and 4, the rear harness 4 includes a frame 11 having for example the form of a rigid metal wire also having a generally U shape, in a bottom and/or front view. This wire includes a concave central part 12, the concavity of which faces upwards and surrounds a padding element 13 also concave for receiving the abdomen part of the animal. The metal wire of the reinforcement 11 also includes side branches 14 extending rearwards of the U up to ends making up attaching pins 15 provided perpendicularly to the side branches 14 and extending sideways. The padding element 13 is for example made of a semi rigid shell covered with a neoprene packing. The padding element 13 includes side parts 16 raising on either side of the body of the animal and extending rearwardly for a stable and comfortable support. The padding element includes in its centre region an extension 17 to the rear providing a pelvic bracket for the animal. Notches 18 are provided between each of the side parts 16 and the centre extension 17 for the legs of the animal to pass through. No link or closure is provided between the rear of the side parts 17 and the rear of the extension 17 in order to relieve the hips of the animal and allow it to do its business. It is further noted that the rear harness can include in its bottom part a spout or a concave area with a shape suitable for receiving the genitalia of a male animal. In the top part, the rear harness is maintained on the body of the animal via a clipping strap system. In the example illustrated in FIGS. 3 and 4, two straps integrated to the harness are provided to lock the rear harness 4 onto the back of the animal. Both attaching pins 15 are to be received in two respective brackets 19, 20, integral with the side branches of the carrying element 6. A first alternative of the embodiment is illustrated in FIG. 1. A second alternative of the embodiment is illustrated in FIG. 2. In the latter case, each bracket 20 consists of a cleat a horizontal branch 21 of which is attached to the side branches of the carrying element 6 and a vertical branch 22 of which is located on the interior side of the U formed by the carrying element 6. The vertical branch 22 includes a groove 23 for receiving a corresponding attaching pin 15 of the rear harness 4.

Conventional pawling means 24 are provided on the vertical branch 22 so as to enable the pin 15 to be introduced into the groove and its inadvertent extraction to be prohibited. These pawling means 24 include an elastic return lash, provided with a sliding ramp against which the pin 15 is applied when introduced, which causes the latch to be rotated about a pivot link connecting it to the bracket 20. When the pin is introduced, the latch pivots in the reverse direction along the arrow L, up to its start position wherein it abuttingly cooperates with the bracket 20 and thereby closes the inlet of the groove 23 to restrain the extraction of the pin 15. The length (or height) H of the groove 23 is a few centimeters, so as to allow a vertical stroke of the pin 15 and thus of the entire rear harness 4, in particular to enable the animal the hind legs of which would tend to support it to redevelop its muscles.

The horizontal branch 21 includes a port 25 having a length I of a few centimeters for a screw for clamping (not shown) to the chassis 6 to pass through. This port enables the gap between both brackets 20 to be set, in particular in order to receive rear harnesses with several sizes.

In this embodiment, the front harness 5 is connected to the chassis 1 via a harnessing device 26 (FIG. 1) having in a top view a generally U shape and in a front view a generally reverse U shape. A front part 27 of this harnessing device forms a downwardly facing concavity, forming a roll bar able to surround the back of the animal substantially at the height of the thorax or the chest. The front harness having generally the shape of a belt is applied to the back of the animal, substantially in the same region. This front harness 5 is maintained on the animal by a ventral strap. Quick fasteners 28 of the "quarter-turn" type or equivalent are provided between the front part 27 forming a roll bar of the harnessing device and the front harness 5. The harnessing device 26 is linked with respect to the chassis 1 via the rear ends of its two side branches 29. The rotation is performed about an axis transverse to the front-rear direction, along the arrow F (FIG. 1), enabling the harnessing device to be substantially moved at 180° downwardly. Thus, the front part of the chassis 1 is released and enables the animal equipped beforehand with the rear harness 4 to be placed onto the chassis, with attaching this rear harness 4 to the brackets 19, 20.

The harnessing device 26 and carrying element 6 assembly can then be folded back by 90° rearwardly and downwardly for the apparatus to be folded suitably for storing and transport.

The harnessing device 26 is then moved back forwardly for the roll bar front part 27 to be located directly above the front harness 5 which will have been disposed beforehand on the animal. The attaching through the quick fasteners 28 is then provided between the front harness 5 and the harnessing device 26.

According to a crucial aspect of the invention which is visible in FIGS. 1 to 5, the device includes a crankshaft-type driveshaft 30 with two crankpins 31, which is rotatably mounted to the bottom of the chassis 1 about an axis X transverse to the front-rear direction. The driveshaft 30 is driven by the rotation of one of the side wheels 2 via transmission means 80, for example with a chain as illustrated in FIG. 1. Only one wheel 2, called drive wheel is likely to drive the driveshaft 30 whereas the other wheel 3 is free with respect to the chassis 1, in order to facilitate the rotation of the device with respect to the vertical when the animal is walking. The driveshaft 30 is aimed at driving the hind legs of the animal, so as to move them synchronously in phase opposition the one with respect to the other, like the movement of a chainset. Both crankpins 31 are thereby provided at 180 degrees with respect to the axis of rotation X.

In this embodiment (FIGS. 1 and 5), the driveshaft 30 is located at the front of the wheels 2, 3. The device further includes a supporting shaft 80 mounted to the chassis 1, transverse to the front-rear direction, this shaft being located behind the axis of rotation of the rear wheels 2, 3.

Means for moving the hind legs 33 of the animal consist of two elongated shape cradles 34, directed longitudinally. Each cradle 34 is linked in its front part to a corresponding crankpin 31 of the driveshaft 30 and rests at the rear on the supporting shaft 80, on which it slides due to a contact of its lower face. Each cradle 34 supports a slipper 35 for receiving and maintaining a hind leg 33 of the animal. The slipper 35 is integral with its cradle 34 so as to be driven by the cyclic movement of the driveshaft 30. It is noted that each cradle 34 supports the slipper 35 in an area which is lowered with respect to at least one of the front and/or rear ends of the cradle 34, in order to decrease the ground clearance of the slippers 35, and move the hind legs closer to their conventional position, as close to the ground as possible. Thus, each cradle has a profile (along the view of FIG. 5) having the form of a pecked line, which can be decomposed from front to rear into several segments as follows: a first segment 36 extending downwards and going rearwardly, a second segment 37 forming a step on which the slipper 35 is attached, a third segment 38 substantially raising up to the level of the top point of the first segment, and then a fourth segment 39 extending to the rear end, substantially parallel to the second segment. The cradle 34 is resting on the supporting shaft 80 in the area of its fourth segment 39.

It is noted that the displacement of the cradles and the movement imparted to the slippers are performed along an ovoid trajectory O. This ovoid trajectory thereby enables the hind legs of the animal to be moved in a way which is as close as possible to the natural walk of the animal.

The device also includes locking/unlocking means selectively providing the transmission of the rotational movement of the driveshaft 30 from the drive wheel 2 or on the opposite the discontinuation of this transmission. It can, in some cases, be indeed desirable to disengage the driveshaft 30 for the hind legs not to be caused to work. This possibility reveals the flexibility of the device to suit to different needs, without resulting to distinct apparatuses. As shown in FIG. 6 in one exemplary embodiment, the drive wheel 2 is in a free rotation configuration with respect to the structure means 9 of the chassis 1, when a locking member 40 releases the link between the wheel 2 and the sprocket wheel controlling the chain 32 (case illustrated in FIG. 6). When this locking member 40 secures the wheel 2 to the sprocket wheel, the transmission is made between the wheel and the chain, which thereby enables the driveshaft 30 to be driven. In the example illustrated, the locking member 40 is a latch pivotably mounted on the hub of the wheel 2, and able to be tilted into engagement with a nut 41 rotatably integral with the sprocket wheel associated to the chain. A return spring 42 ensures that the latch remains in a stable position regardless of the configuration selected, whether locked or unlocked. In other alternative embodiments which are not illustrated, there can be provided other locking/unlocking modes, in particular with a clamping thumb wheel or any other equivalent means.

According to another aspect of the invention, and also in an attempt to provide for operating flexibility enabling the dog to walk naturally and with no impediments at the end of a rehabilitation process, the driveshaft 30 is mounted so as to be removable from the chassis 1. This shaft 30 can for example include movable or telescopic parts in the direction of the axis of rotation X, enabling tip ends of the driveshaft 30 to be sleeved or extracted in ports of the chassis which form guide bearings.

In one alternative, the ends of the driveshaft 30 can also be retained by screw-wing nut type means (not shown) allowing a quick mounting or dismounting of the shaft 30.

In the same way, the supporting shaft 32 is removably mounted to the chassis, by analogue means. It is thus possible to completely remove the driveshaft, the supporting shaft, the cradles and slippers, for example in an advanced rehabilitation phase, where the animal would have recovered a significant part of its motor abilities. However, it would still be assisted by being supported by the rear harness.

It is further noted that the chassis 1 can include one or two side stands 43 linked to structure elements 9, 10 at the bottom of the chassis 1 (FIG. 1). These stands 43 maintain the attitude of the chassis before installing the animal. They are deployable (as illustrated) or foldable along the arrow G when the device is installed on the animal.

SECOND EMBODIMENT

FIGS. 7 to 9

The animal 44 is maintained in a harness made of two parts 45 and 46. This harness is maintained by a lower chassis also made with two parts 47 and 48. The part 48 itself comprises a top rigid subassembly 49, integral with 48 and enabling support and seat to the part of the harness 46 which is to receive and support the hindquarters of the animal 44. This whole device enables said animal to be maintained at a height suitable for its rehabilitation stage. An axis 50 is integral with all the elements 48, 49 and 46 to allow a laterally and horizontally linked connection with all the elements 47 and 45. The part 48 of the chassis receives a crankshaft-type driveshaft 51, having itself a free wheel 52 at one end and a drive wheel 53 of the crankshaft at the other end. Said crankshaft 51 thus enables two slippers 54 to be moved opposite to one another such as a chainset. The slippers are comprised of a gutter 55 receiving the leg of the animal 44 and the latter will be maintained therein by straps 56. A system of clips 57 is integrated to said gutters thus enabling them to be attached to the shaft 51 by leaving them the possibility of a free rotation on said shaft 51. Each slipper 54 eccentrically moves with respect to its adjacent wheel. A suitcase handle type upper handle 58 connects the part 46 to the part 45. A bumper 59 is attached below the part 48 and ahead of both wheels 52 and 53 ensuring the integrity of the animal legs in case of obstacles.

A device comprised of a thumb wheel 60 screwed to the shaft 51 is to lock or not and on demand the wheel 53, itself responsible for driving the crankshaft 51. Each of both wheels will be retained on the shaft 51, through a "blind" nut 61. The thumb wheel 60 is placed between the wheel 53 and its adjacent "blind" nut 61.

(It would seem that references 59 (FIG. 8) and 58 (FIG. 57) are not described in the text ??)

THIRD EMBODIMENT

FIG. 10

The animal 44 will be hung by a harness above the device through a chassis 62. The device is comprised of said chassis 62 which includes on the outside two wheels 63 and 64 moving in parallel and positioned longitudinally to the animal. Said wheels are connected between each other by a first crankshaft-type driveshaft 65 with two crankpins 66 in order to move synchronously in a phase opposition, like the movement of a chainset, each of both hind legs of said animal. One of the wheels 63 drives said crankshaft 65 on demand thanks to the locking/unlocking by a thumb wheel 67 of said wheel 63 to/from said crankshaft 65. This allows exercising or not the hindquarters of said animal when displaced. The second wheel 64 remains free. Said crankshaft-type driveshaft 65 operates together with a second crankshaft called follower shaft 68 of the same type and the latter is positioned ahead of the former 65. A link by two equal sprocket wheels 69 and 70 and a transmission chain 71 connecting them synchronizes both crankshafts 65 and 68 with each other. Two cradles 72 and 73 positioned parallel to each other connect both crankshafts 65 and 68 with each other through the crankpins 66 thereof, with one crankpin on each of both crankshafts. Both crankshafts 65 and 68 however have a different diameter for said cradles 72 and 73 to move on an ovoid trajectory 74. This ovoid trajectory thereby enables the hind legs of the animal to be moved in a trajectory as close as possible to the natural walk of the animal. The drive crankshaft 65, positioned at the rear, is the one having a lower diameter with respect to the other crankshaft 68 (in one alternative, it can have a higher diameter than the latter). Said cradles 72, 73 are connected and linked only to the crankpins of the rear crankshaft 65 and merely rest on the crankpins of the follower crankshaft 68 where they slide on their lower area 75. This allows to solve the problem of the distensions related to the crankpins being far from each other when revoluting on their respective crankshaft. Two slippers 76 are then positioned and attached to both cradles 72 and 73 one per cradle and each receives a hind leg of said animal. Said legs are tightly maintained by their metatarsus in their respective slipper. Said slippers are each made integral to their respective cradle by a bracket 77 at an angle 78 defined in order to impose to the legs of said animal an adequate orientation optimizing and matching its movements. As a result, the "shoulder", "elbow" and "heel" joints of said animal have to work upon the pulse imposed by the device as illustrated in FIG. 10. This precision regarding the positioning of slippers can also be applied to the first embodiment of the invention.

Of course, the invention is not limited to the means just described and comprises all the technical equivalents.

For example, the chain transmission means can be replaced by a belt system, or even by a pinion assembly.

The invention claimed is:

1. A device allowing a quadruped animal that is disabled in the hindquarters thereof to move about while automatically moving the hind legs of the animal, the device comprising:

a chassis, on which two side wheels are mounted;
a rear harness for receiving and supporting the hindquarters of the animal, wherein said rear harness is supported by the chassis;
two cradles configured to move the hind legs of the animal;
a crankshaft-type driveshaft having two crankpins, each of said two crankpins being attached to a different one of the two cradles, said driveshaft being shaped so as to move each of the two hind legs of the animal synchronously in phase opposition; and
a transmission device for controlling rotation of the driveshaft from at least one of the wheels.

2. The device according to claim 1, wherein the transmission device includes a locking/unlocking member configured to selectively provide transmission of the rotational movement of the driveshaft from at least one of the wheels.

3. The device according to claim 1, wherein the driveshaft is removably rotatably mounted to the chassis.

4. The device according to claim 1, wherein the rear harness includes a frame attached to the chassis by a pawl allowing at least a vertical stroke of the rear harness.

5. The device according to claim 1, further comprising a height adjuster for adjusting a vertical position of the rear harness with respect to the chassis, wherein the height adjuster is a rack-and-pinion-type height adjuster.

6. The device according to claim 1, wherein the rear harness is generally in a shape of a belt surrounding the abdomen of the animal and is provided with an extension making up a pelvic bracket.

7. The device according to claim 1, wherein the two cradles each includes a slipper wherein the two hind legs of the animal are received and supported in order for the hind legs to move as a chainset.

8. The device according to claim 1, further comprising a front harness configured to attach the thoracic part of the animal to the chassis, said front harness being pivotable with respect to the chassis.

9. The device according to claim 8, wherein the driveshaft is substantially coaxial with an axis of the wheels, the chassis including an anterior part and a posterior part, the posterior part in turn including an upper rigid subassembly for supporting the rear harness, whereas the anterior part is rotatably mounted with respect to the posterior part about a substantially vertical axis, the anterior part being further attached to the front harness.

10. The device according to claim 1, wherein the driveshaft is located ahead of the wheels relatively to a front-rear longitudinal direction, a front part of each of the two cradles being driven by a respective crankpin of the driveshaft on which each of the two cradles is rotatably mounted, and a rear part of each of the two cradles resting on a supporting shaft carried by the chassis.

11. The device according to claim 10, wherein the front part of each of the two cradles provides a ground clearance that is less than a ground clearance of the rear part.

12. The device according to claim 1, wherein the driveshaft is substantially coaxial with an axis of the wheels, the device further including a crankshaft-type follower shaft with two crankpins, which shaft is located ahead of the driveshaft, and driven by the crankshaft via a transmission device, a rear part of each of the two cradles being driven by a respective crankpin of the driveshaft on which it is rotatably mounted, and resting at a front part on a corresponding crankpin of a follower shaft.

13. The device according to claim 1, wherein a single wheel is able to drive the driveshaft whereas the other wheel is free.

14. The device according to claim 1, wherein a reduction ratio between the driveshaft and a driving wheel is between ⅓ and 1.

15. The device according to claim 1, wherein a reduction ratio between the driveshaft and a driving wheel is ½.

* * * * *